United States Patent
Herthan

(10) Patent No.: US 9,689,982 B2
(45) Date of Patent: Jun. 27, 2017

(54) OBJECT DETECTION DEVICE FOR A VEHICLE AND VEHICLE HAVING THE OBJECT DETECTION DEVICE

(71) Applicant: BROSE FAHRZEUGTEILE GMBH & CO. KOMMANDITGESELLSCHAFT, HALLSTADT, Hallstadt (DE)

(72) Inventor: Bernd Herthan, Michelau (DE)

(73) Assignee: Brose Fahrzeugteile GmbH & Co. KG, Hallstadt (DE)

( * ) Notice: Subject to any disclaimer, the term of this patent is extended or adjusted under 35 U.S.C. 154(b) by 415 days.

(21) Appl. No.: 14/322,012

(22) Filed: Jul. 2, 2014

(65) Prior Publication Data

US 2015/0009062 A1 Jan. 8, 2015

(30) Foreign Application Priority Data

Jul. 2, 2013 (DE) .......................... 10 2013 010 993

(51) Int. Cl.
*G01S 13/93* (2006.01)
*E05B 83/16* (2014.01)
(Continued)

(52) U.S. Cl.
CPC ............ *G01S 13/931* (2013.01); *E05B 81/76* (2013.01); *E05B 83/16* (2013.01); *G01S 7/41* (2013.01);
(Continued)

(58) Field of Classification Search
CPC ........ G01S 13/93; G01S 13/931; G01S 13/04; G01S 13/56; G01S 13/0209;
(Continued)

(56) References Cited

U.S. PATENT DOCUMENTS

| 4,421,350 A | * | 12/1983 | Gotomyo | .............. E05B 53/001 |
| | | | | 292/123 |
| 4,815,046 A | * | 3/1989 | Dorr | ....................... G01S 15/04 |
| | | | | 367/103 |

(Continued)

FOREIGN PATENT DOCUMENTS

| CN | 101574946 A | 11/2009 |
| CN | 102018503 A | 4/2011 |

(Continued)

*Primary Examiner* — Peter Bythrow
(74) *Attorney, Agent, or Firm* — Laurence A. Greenberg; Werner H. Stemer; Ralph E. Locher

(57) ABSTRACT

An object detection device for a vehicle monitors the surroundings at the rear of the vehicle. The object detection device has a radar sensor for generating a radar signal containing information about a distance between the vehicle and a vehicle user or another object in the surroundings. The radar sensor mounts on a vehicle component pointing toward the surroundings to the rear of the vehicle. Furthermore, the object detection device contains a control and evaluation unit for determining a movement pattern of the vehicle user on the basis of the radar signal, and to compare the movement pattern with a predefined reference pattern and to actuate a servomotor which has the purpose of actuating the tailgate between an open position and a closed position when the movement pattern corresponds to the reference pattern. Furthermore, a vehicle ideally has such an object detection device.

11 Claims, 3 Drawing Sheets

(51) Int. Cl.
  *G01S 7/41*   (2006.01)
  *G01S 13/02*  (2006.01)
  *G01S 13/88*  (2006.01)
  *E05B 81/76*  (2014.01)
  *B60R 25/10*  (2013.01)
  *B60R 25/20*  (2013.01)
  *E05F 15/73*  (2015.01)

(52) U.S. Cl.
  CPC .......... *G01S 7/415* (2013.01); *G01S 13/0209* (2013.01); *G01S 13/88* (2013.01); *B60R 25/10* (2013.01); *B60R 25/20* (2013.01); *E05F 15/73* (2015.01); *E05Y 2400/44* (2013.01); *E05Y 2900/546* (2013.01); *G01S 2013/9378* (2013.01); *G01S 2013/9382* (2013.01); *G01S 2013/9389* (2013.01); *G01S 2013/9396* (2013.01); *G07C 2209/64* (2013.01)

(58) Field of Classification Search
  CPC .. G01S 2013/9371–2013/9396; H03K 17/945; B60R 25/2045; B60R 25/2054; E05B 81/79; E05B 81/78; E05F 15/73; G07C 2209/64
  USPC ................................ 342/27, 28, 70–72, 175
  See application file for complete search history.

(56) References Cited

U.S. PATENT DOCUMENTS

| | | | |
|---|---|---|---|
| 5,028,920 A | 7/1991 | Dombrowski | |
| 5,369,911 A * | 12/1994 | Fortunato | E05F 5/025 49/25 |
| 5,663,704 A * | 9/1997 | Allen | B60R 25/1001 307/10.2 |
| 5,682,135 A * | 10/1997 | Labonde | G07C 9/00309 180/287 |
| 5,929,769 A * | 7/1999 | Garnault | B60R 25/2009 340/12.51 |
| 6,205,710 B1 * | 3/2001 | Busse | G01S 13/48 49/26 |
| 6,218,929 B1 * | 4/2001 | Furuta | G07C 9/00309 340/10.1 |
| 6,268,803 B1 * | 7/2001 | Gunderson | B60Q 9/006 180/168 |
| 6,600,285 B2 * | 7/2003 | Mintgen | B62D 25/12 318/286 |
| 6,825,752 B2 * | 11/2004 | Nahata | E05B 81/78 180/273 |
| 6,847,289 B2 * | 1/2005 | Pang | B60R 25/246 307/10.1 |
| 6,856,239 B1 * | 2/2005 | Hicks | B60R 25/2036 296/155 |
| 7,034,485 B2 * | 4/2006 | Kuan | E05F 15/63 296/146.4 |
| 7,132,768 B2 * | 11/2006 | Ieda | E05B 81/78 307/652 |
| 7,219,945 B1 * | 5/2007 | Zinn | B60J 5/101 296/56 |
| 7,221,118 B2 * | 5/2007 | Sasaki | E05F 15/73 318/282 |
| 7,283,034 B2 * | 10/2007 | Nakamura | B60R 25/246 340/5.2 |
| 7,446,645 B2 * | 11/2008 | Steegmann | B60R 25/246 340/5.6 |
| 7,688,179 B2 * | 3/2010 | Kurpinski | B60R 25/2036 340/4.1 |
| 7,755,540 B2 * | 7/2010 | Mezger | G01S 7/40 342/165 |
| RE41,674 E * | 9/2010 | Sasaki | E05F 15/73 318/282 |
| 8,091,280 B2 * | 1/2012 | Hanzel | B60R 25/2054 296/146.4 |
| 8,228,166 B2 * | 7/2012 | Eberhard | B60R 25/2036 340/5.61 |
| 8,717,429 B2 * | 5/2014 | Giraud | E05B 81/78 348/77 |
| 8,788,152 B2 * | 7/2014 | Reimann | B60R 25/2036 296/146.4 |
| 9,081,032 B2 * | 7/2015 | Lange | B60R 25/2045 |
| 9,163,446 B2 * | 10/2015 | Houser | E05F 15/79 |
| 9,243,439 B2 * | 1/2016 | Adams | E05F 15/73 |
| 9,344,083 B2 * | 5/2016 | Elie | H03K 17/945 |
| 2001/0042989 A1 * | 11/2001 | Greif | B60J 5/101 296/50 |
| 2006/0170584 A1 | 8/2006 | Romero et al. | |
| 2007/0205863 A1 * | 9/2007 | Eberhard | B60R 25/2036 340/5.72 |
| 2007/0247275 A1 * | 10/2007 | Steegmann | B60R 25/246 340/5.2 |
| 2008/0068145 A1 * | 3/2008 | Weghaus | B60R 25/2054 340/426.25 |
| 2011/0172827 A1 * | 7/2011 | Eichmann | G01S 7/003 700/275 |
| 2011/0242303 A1 * | 10/2011 | Giraud | E05B 81/78 348/77 |
| 2011/0276234 A1 * | 11/2011 | Van Gastel | E05B 81/78 701/49 |
| 2012/0158253 A1 | 6/2012 | Kroemke et al. | |
| 2012/0319502 A1 * | 12/2012 | Van Gastel | E05F 15/73 307/116 |
| 2013/0055639 A1 | 3/2013 | Brosseit | |
| 2013/0079985 A1 * | 3/2013 | Wolf | B60R 25/2045 701/36 |
| 2013/0234733 A1 * | 9/2013 | Lange | B60R 25/2045 324/658 |
| 2013/0293245 A1 | 11/2013 | Kuhnen et al. | |
| 2014/0324273 A1 * | 10/2014 | Russ | B60R 25/00 701/29.1 |

FOREIGN PATENT DOCUMENTS

| | | |
|---|---|---|
| CN | 102128000 A | 7/2011 |
| CN | 102458934 A | 5/2012 |
| CN | 102996002 A | 3/2013 |
| DE | 102006044112 A1 | 3/2008 |
| DE | 102009019673 A1 | 11/2010 |
| DE | 102009040395 A1 | 4/2011 |
| DE | 102010060364 A1 | 5/2012 |
| DE | 102011008275 A1 | 7/2012 |
| EP | 2159362 A1 | 3/2010 |
| JP | 2005324664 A | 11/2005 |
| JP | 2006225953 A | 8/2006 |
| JP | 2009047505 A | 3/2009 |
| KR | 1020120062115 | 6/2012 |

* cited by examiner

OBJECT DETECTION DEVICE FOR A VEHICLE AND VEHICLE HAVING THE OBJECT DETECTION DEVICE

CROSS-REFERENCE TO RELATED APPLICATION

This application claims the priority, under 35 U.S.C. §119, of German application DE 10 2013 010 993.0, filed Jul. 2, 2013; the prior application is herewith incorporated by reference in its entirety.

BACKGROUND OF THE INVENTION

Field of the Invention

The invention relates to an object detection device for a vehicle, which object detection device is configured and provided for monitoring the surroundings to the rear of the vehicle. In addition, the invention relates to a vehicle having such an object detection device.

Modern vehicles have had for some time now automatically actuatable hatches (i.e. trunk lids or tailgate) in order to increase the operating comfort. Such hatches are generally pivoted about a hinge. The opening of the hatch is normally triggered by activating a switch on the vehicle itself (for example integrated into the door handle) or on a key remote-control.

It is disadvantageous in this context that frequently both hands of a vehicle user who is about to load something into the vehicle through the hatch opening are not free (for example as a result of transporting objects), with the result that the vehicle user cannot activate a switch or the key remote-control without difficulty.

In order to remedy this disadvantage, it is known, for example from published, non-prosecuted German patent application DE 10 2011 008 275 A1 (corresponding to U.S. patent publication No. 2013/0293245), to detect a kicking movement directed under the rear bumper by a capacitive sensor. The detected kicking movement is interpreted here as a tailgate opening command. The automatic tailgate opening can therefore be triggered by a kick under the rear bumper. However, the range of such a capacitive sensor is limited. For this reason, the vehicle user who wishes to open the tailgate by means of a kick must usually be located at a distance of significantly less than one meter from the vehicle. In particular, the vehicle user is therefore frequently in the actuating path of the opening hatch and has to move away from the hatch, which can be awkward, in particular when he is carrying heavy objects or in the case of physical restriction.

SUMMARY OF THE INVENTION

The invention is based on the object of improving the operation of a vehicle in this respect.

The object is achieved according to the invention by means of an object detection device for a vehicle. Furthermore, the object is achieved according to the invention by a vehicle having the objection detection device. Advantageous embodiments and developments of the invention which are to a certain extent inventive per se are disclosed in the dependent claims and the following description.

The object detection device according to the invention is configured and provided for monitoring the surroundings to the rear of the vehicle. For this purpose, the object detection device contains a radar sensor for generating a radar signal which contains information about a distance between the vehicle and a vehicle user or another object in the surroundings to the rear of the vehicle. The radar sensor is configured in this context for mounting on a vehicle component pointing toward the surroundings to the rear of the vehicle. The radar sensor is therefore mounted in the correct final mounting position of the vehicle on such a vehicle component which points to the rear, in particular it is integrated into such a vehicle component.

Furthermore the object detection device contains a control and evaluation unit which is configured in terms of circuitry and programs to determine a movement pattern of the vehicle user on the basis of the radar signal. The vehicle user here is generally considered to be a person who is approaching the vehicle with the intention of opening or closing a hatch (trunk lid (tailgate)) of the vehicle. Furthermore, the control and evaluation unit is configured to compare the movement pattern with a predefined reference pattern and to actuate a servomotor which is assigned to the hatch and has the purpose of actuating the hatch between an open position and a closed position when the movement pattern corresponds to the reference pattern. The control and evaluation unit is consequently configured to detect an opening or closing command (generally "actuation command") for the hatch which is signaled by a specific movement of the vehicle user and to initiate the corresponding actuation of the hatch.

Since movements of persons can as a rule not be reproduced precisely and therefore when they are carried out repeatedly by one or more vehicle users always occur differently to a certain extent, in this context precise correspondence of the detected movement pattern with the stored reference pattern is not expected. Correspondingly, the control unit performs imprecise testing to determine whether there is sufficient correspondence (i.e. sufficient similarity) of the detected movement pattern with the stored reference pattern. In order to assess whether there is (sufficient) correspondence, the control unit uses a predefined criterion (for example predefined tolerance limits) in this context.

The control and evaluation unit is preferably configured here to infer the movement pattern of the vehicle user from the radar signal using a pattern detection method and to generate a test signal which is characteristic of the movement pattern. The control and evaluation unit is also preferably configured here subsequently to compare the test signal with a reference signal which is characteristic of the reference pattern and expediently stored in a memory module of the object detection device.

The control and evaluation unit can be embodied in the scope of the invention as a non-programmable electronic circuit and be integrated here, for example, into a controller of the servomotor. However, in the scope of the invention the control unit can also be formed by a microcontroller in which the functionality for evaluating the radar signal is implemented in the form of a software module.

The radar sensor advantageously has a range of several meters, which is large compared to the capacitive sensors which are customarily used. The vehicle user can therefore also be located at a comparatively large distance (of, for example, two meters) from the hatch for the outputting of the actuation command. This is advantageous in particular when the person is heavily loaded, i.e. is carrying one or more heavy objects. In this case, the person can initiate the actuation of the hatch outside the pivoting range of the hatch without subsequently having to step out of the actuation path in order to avoid the hatch. The term "actuation path" and the term "pivoting range", which is more precise for a hatch, denote here the spatial volume which the hatch passes through during its actuation.

The movement pattern which is used for signaling the actuation command can, in the scope of the invention, be selected from a multiplicity of different body movements thanks to the use of the radar sensor. Therefore, in the scope of the invention this movement pattern can be, in particular, a foot movement (in particular a "kick"), a bending movement, a movement of the entire head (for example nodding or shaking of the head) or part of the head (for example a change in the facial expression). Owing to the use of the radar sensor, small movements such as, for example, a movement of the eyelids or change in the viewing direction of the eyes can advantageously also be detected here. It is therefore possible for a heavily loaded vehicle user to carry out the movement pattern which is necessary to signal the actuation command in a particularly easy way and with extremely little physical effort while he is standing in a stable fashion with both feet on the ground.

In one expedient embodiment, the vehicle component in which the radar sensor is mounted in the correct final mounting state is a (rear-mounted) light module. In the scope of the invention, these modules can be light modules which are arranged on the side of the vehicle and in which tail lights and brake lights, flashing indicator lights etc. are integrated, or the third brake light which is generally arranged above or below the rear windshield. The light modules in this context are generally arranged at the rear of the vehicle in such a way that virtually the entire surroundings to the rear of the vehicle can be seen by the respective light module (and therefore can be detected by the radar sensor). Owing to the exposed position in the light module, the measuring range of the radar sensor is advantageously not placed in shadow, or only to a negligible extent, by metallic bodywork components of the vehicle.

In a further embodiment, the vehicle component is a rear bumper which is preferably fabricated from plastic and therefore is particularly permeable to radar radiation. In yet a further embodiment, the vehicle component is a roof separation edge which is arranged above the rear windshield on the vehicle. Such a roof separation edge is conventionally provided for directing the air flowing along the vehicle roof during travel in a targeted fashion over the rear of the vehicle. The roof separation edge here generally protrudes from the vehicle in the form of a small spoiler, with the result that the radar radiation which is emitted by the radar sensor which is mounted in the roof separation edge is hardly placed in shadow by vehicle components.

In the scope of the invention it is also conceivable that in the correct final mounting state the radar sensor is arranged in a license plate recess embedded at the rear of the vehicle. In the scope of the invention it is furthermore also conceivable for the radar sensor to have a plurality of radar antennas which each serve to transmit and receive radar radiation. Each of the plurality of radar antennas can be respectively arranged in the scope of the invention on one of a plurality of different vehicle components. However, one or more radar antennas can also be distributed over a plurality of vehicle components. By using a plurality of radar antennas which are, in particular, directed differently it is possible for radar echoes, i.e. reflected radar radiation, to be detected from different directions by the radar sensor, and therefore for a particularly large range of the surroundings to the rear to be monitored.

In a preferred embodiment, the radar sensor is embodied as an ultra-broadband radar sensor (also referred to as a UWB radar sensor). UWB radar has here the advantage that particularly short radiation pulses are emitted which have a particularly large frequency bandwidth with very low pulse power.

UWB radar is particularly suitable here for detecting objects and movements with a particularly high spatial resolution. This means that comparatively small movements, such as, for example, blinking of an eye or an eye movement, can be detected particularly precisely. Owing to the low pulse power, the absorption of energy by the UWB radar sensor is particularly low. Furthermore, a UWB radar sensor has a detection range of several meters, which is expedient for use on a vehicle.

In an expedient embodiment, the control and evaluation unit is configured to detect, on the basis of the radar signal, whether a detected object is human or animal or an object (which also includes plants). As a result, a particularly high level of fail safety during the detection of the movement pattern is achieved. In addition, the possibility of distinguishing between human (or animal) obstacles, on the one hand, and objects, on the other, on the basis of the radar signal can also be advantageously used in the scope of a driver assistance system (for example a reversing aid). This differentiation is particularly expedient, for example, in an automatic carwash, especially since the driver assistance system in this case can differentiate between the washing brushes which are unavoidably arranged very close to the vehicle, and any persons or animals in the blind spot of the vehicle. The differentiation between people or animals and objects by a driver assistance system is also of equal advantage when maneuvering in multistory car parks and other tight spaces. The object detection device is correspondingly also preferably used in the scope of such a driver assistance system.

In order to differentiate between people or animals and objects, the control and evaluation unit checks, for example by using a pattern recognition or frequency analysis method, whether the radar signal contains a movement pattern which is characteristic of a heartbeat. Alternatively, in the scope of the invention the permittivity (dielectric constant) of the material of the detected object can also be determined by the UWB radar sensor and it is therefore possible to differentiate between human/animal tissue and inanimate material.

In a further expedient embodiment, the control and evaluation unit is configured for a keyless access function (sometimes also referred to as a "keyless entry" or "keyless go"). In such a function, the doors of the vehicle are automatically unlocked if the presence of the electronic vehicle key (radio key) which is assigned to the vehicle is detected. The keyless access function is also used by the control and evaluation unit to ensure that in a time environment with the detection and/or evaluation of the movement pattern (i.e. before, during and/or after the detection of the movement pattern) the presence of a key signal which is assigned to the electronic vehicle key is checked. In the scope of the invention it is conceivable here for information about the presence or absence of the key signal to be fed from an external control unit to the control and evaluation unit. Alternatively, the keyless access function, and therefore the function for detecting the key signal in the scope of the invention, can also be integrated directly into the control and evaluation unit. For this purpose, the control and evaluation unit optionally has a reception module for detecting the key signal.

In the scope of the invention it is conceivable here that the control and evaluation unit firstly actuates the radar sensor in a distance measuring mode (comparable to a double radar) for performing pure distance measurement between an object in the surroundings to the rear and the vehicle. If the control and evaluation unit detects, on the basis of a change in the distance, the approaching of an object and in addition the key signal is present, the control and evaluation unit switches to an image-generating mode in which the control and evaluation unit determines the movement pattern on the basis of the radar signal.

In a further advantageous embodiment, the control and evaluation unit is additionally configured to determine, during the actuation of the hatch, the presence or absence of an obstacle in the pivoting range located in front of the hatch, on the basis of the radar signal, and to stop or reverse the actuation of the hatch when an obstacle is detected, i.e. to reverse the direction of movement. The object detection device according to the invention is therefore additionally used in this embodiment as a collision prevention device in order to prevent the hatch colliding with the obstacle during the opening or closing of the hatch, in particular to prevent a body part or object becoming trapped between the hatch and the border of the hatch opening.

In one advantageous embodiment, the radar sensor contains an additional radar antenna which is oriented toward the upper side of the vehicle. The additional radar antenna is expedient in particular in the scope of the collision prevention since the distance between the hatch and an obstacle which is arranged above the vehicle, for example multistory car park ceiling or garage ceiling, can be detected by of the upwardly oriented radar antenna. The opening of the hatch can therefore be stopped by the control and evaluation unit before the hatch strikes this obstacle.

In a further expedient embodiment, the control and evaluation unit is additionally configured to detect, in the case of reversing of the vehicle, an obstacle arranged in the surroundings to the rear of the vehicle, on the basis of the radar signal, and if appropriate to output a warning signal as a function of the distance between the vehicle and the obstacle. The object detection device according to the invention is therefore also used (as a reversing aid) in this embodiment.

The object detection device according to the invention can consequently be used in an advantageous and simple way for various functions, namely for detecting a movement pattern, as well as additionally in the scope of a driver assistance system, as a reversing aid and/or as a collision prevention device, while eliminating the need for additional sensors.

In particular, when the object detection device is used as a reversing aid, the radar sensor optionally has a (further) radar antenna which is directed in the direction of the ground surrounding the vehicle to the rear. Therefore, the edge of the curb, which is generally arranged at a significantly lower position, can be detected by the radar sensor in addition to an obstacle (for example a vehicle) which is arranged behind the vehicle. This solves, in particular, the problem that the height of an edge of the curb is frequently dimensioned such that although the edge of the curb is not detected as an obstacle by conventional parking sensors, it can nevertheless come into contact with a rear apron of the vehicle.

The vehicle according to the invention, in particular a passenger car, contains a hatch and an object detection device of the type described above.

Other features which are considered as characteristic for the invention are set forth in the appended claims.

Although the invention is illustrated and described herein as embodied in an object detection device for a vehicle and a vehicle having the object detection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings (examples).

DETAILED DESCRIPTION OF THE INVENTION

Figure 1:
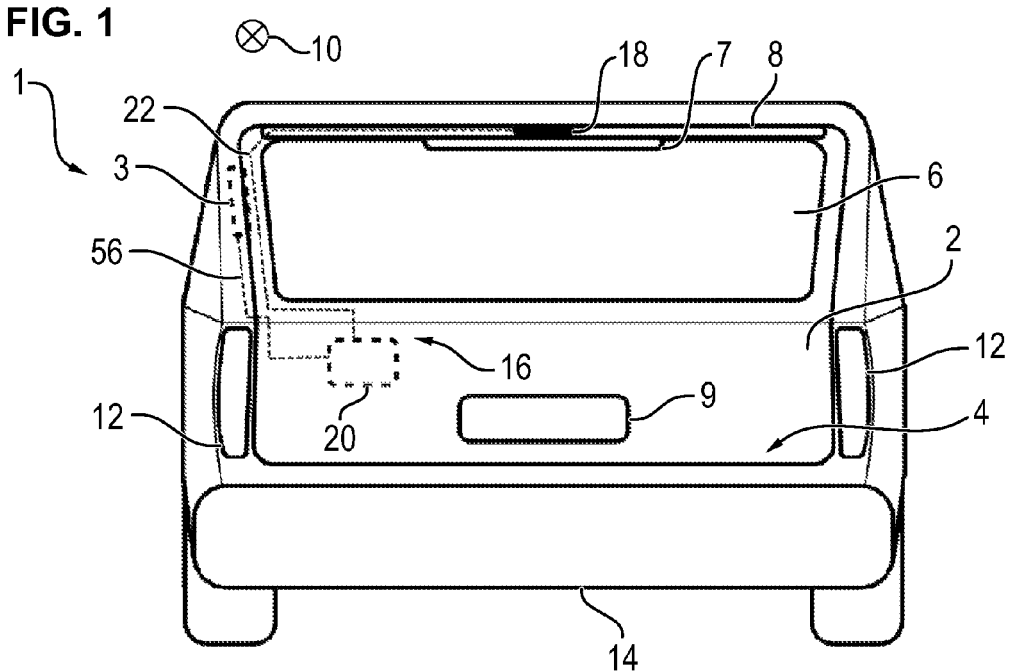
FIG. 1 is a diagrammatic, rear view of a rear of a vehicle with an object detection device according to the invention.

Corresponding parts are always provided with the same reference numerals in all the figures. Referring now to the figures of the drawings in detail and first, particularly to FIG. 1 thereof, there is shown a rear 1 of a vehicle, in particular of a passenger car. A tailgate 2, which can be actuated in a reversible fashion between a closed position 4 and an open position 5 (illustrated in FIG. 3) by an adjustment motor 3 such as a servomotor 3, which is arranged on the rear 1. The tailgate 2 has a rear window which is closed off by a rear windshield 6. A ("third") brake light 7 is arranged above the rear windshield 6. In turn a roof separation edge 8, which is embodied in the form of a small spoiler, is arranged above the rear windshield 6. A license plate recess 9 is also formed in the tailgate 2.

A tail light module 12 is mounted on the rear 1 of the vehicle on each side of the tailgate 2. The respective tail lights, the brake lights, the direction indicator lights (flashing indicator lights) etc. are integrated into the tail light modules 12. Furthermore, a rear bumper 14 is mounted on the lower edge of the rear 1. The vehicle also contains an object detection device 16 which has a radar sensor 18 and a control and evaluation unit (referred to in an abbreviated form as control unit 20). The control unit 20 is coupled here to the radar sensor 18 by a signal line 22.

Figure 4:
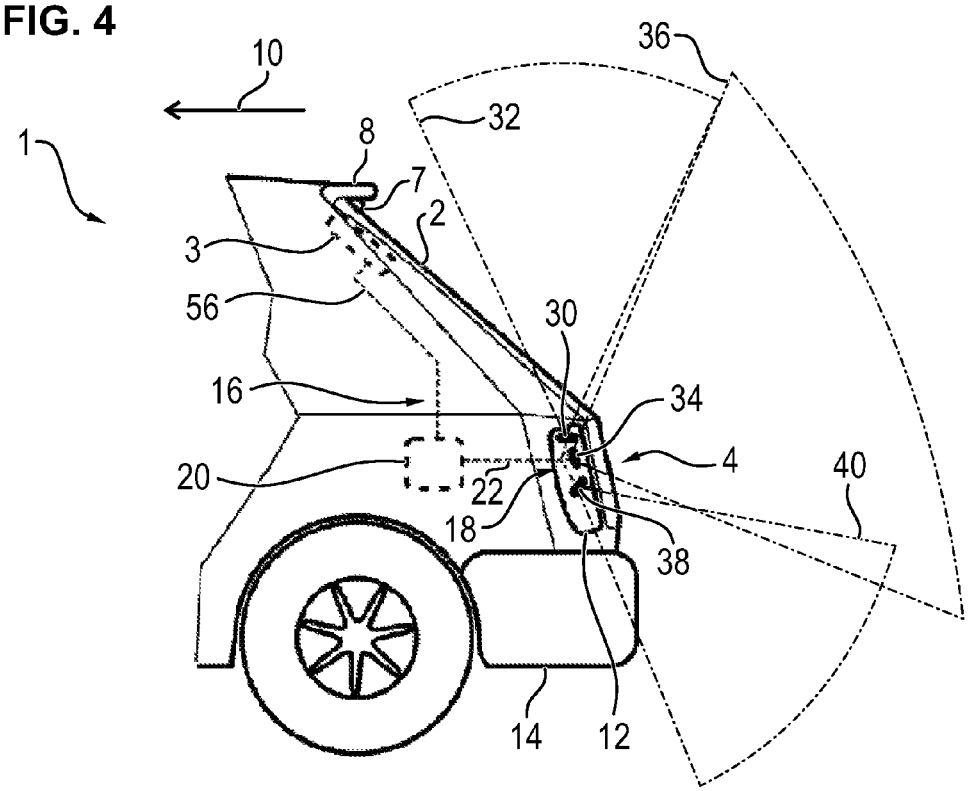
FIG. 4 and FIG. 5 are side views each showing, in a view according to FIG. 2, a further exemplary embodiment of the object detection device.
Figure 5:
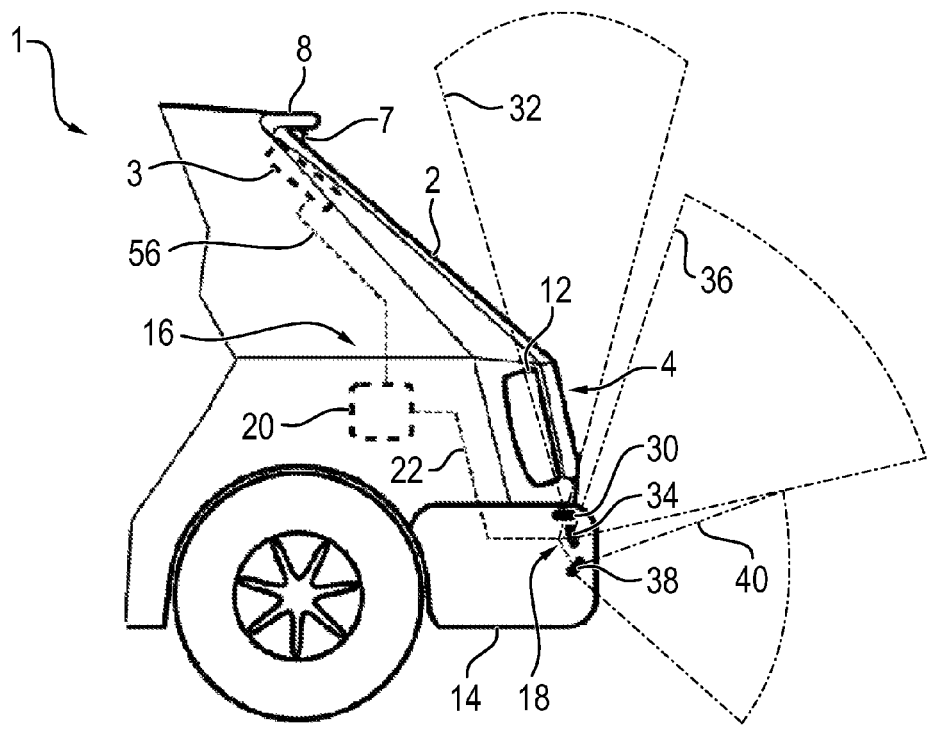
Figure 6:
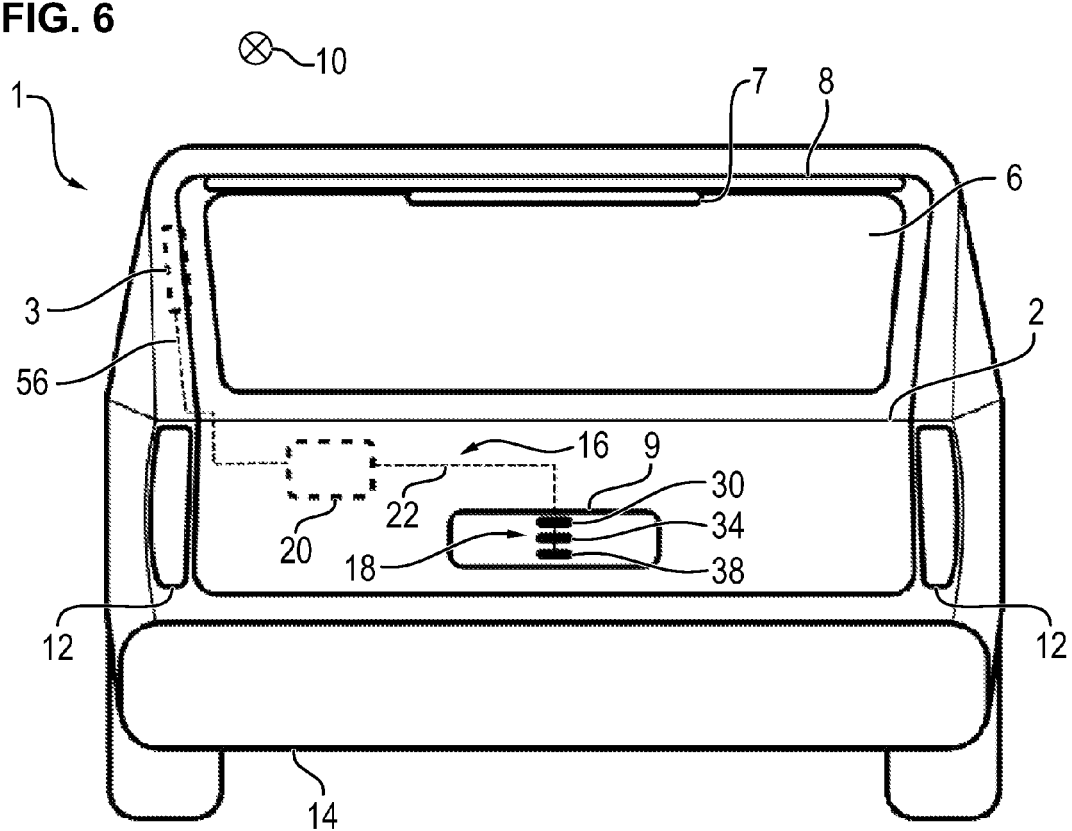
FIG. 6 is a rear view of a vehicle showing a further exemplary embodiment of the object detection device.

The radar sensor 18 contains, as is illustrated in more detail in FIGS. 4 to 6, three radar antennas which are separate from one another and which are oriented at different angles to the direction of travel 10. Each individual radar antenna therefore transmits and receives radar radiation into or from a different spatial angle, i.e. an approximately conical volume, which opens from the radar antenna in the direction of the surroundings of the vehicle. A radar antenna which is referred to as an upper antenna 30 irradiates here into a spatial angle which is oriented approximately perpendicularly with respect to the direction of travel 10 toward the upper side of the vehicle and is referred to as an upper measuring range 32. The radar antenna which is referred to as a central antenna 34 irradiates into a spatial angle which is referred to as a central measuring range 36. A third radar antenna is referred to as a lower antenna 38 and irradiates into a spatial angle which is referred to as a lower measuring range 40. The measuring ranges 32, 36, 40 are fanned out here in the vertical direction of the vehicle, with the result that the measuring ranges 32, 36, 40 adjoin one another (see FIGS. 4 and 5).

Figure 2:
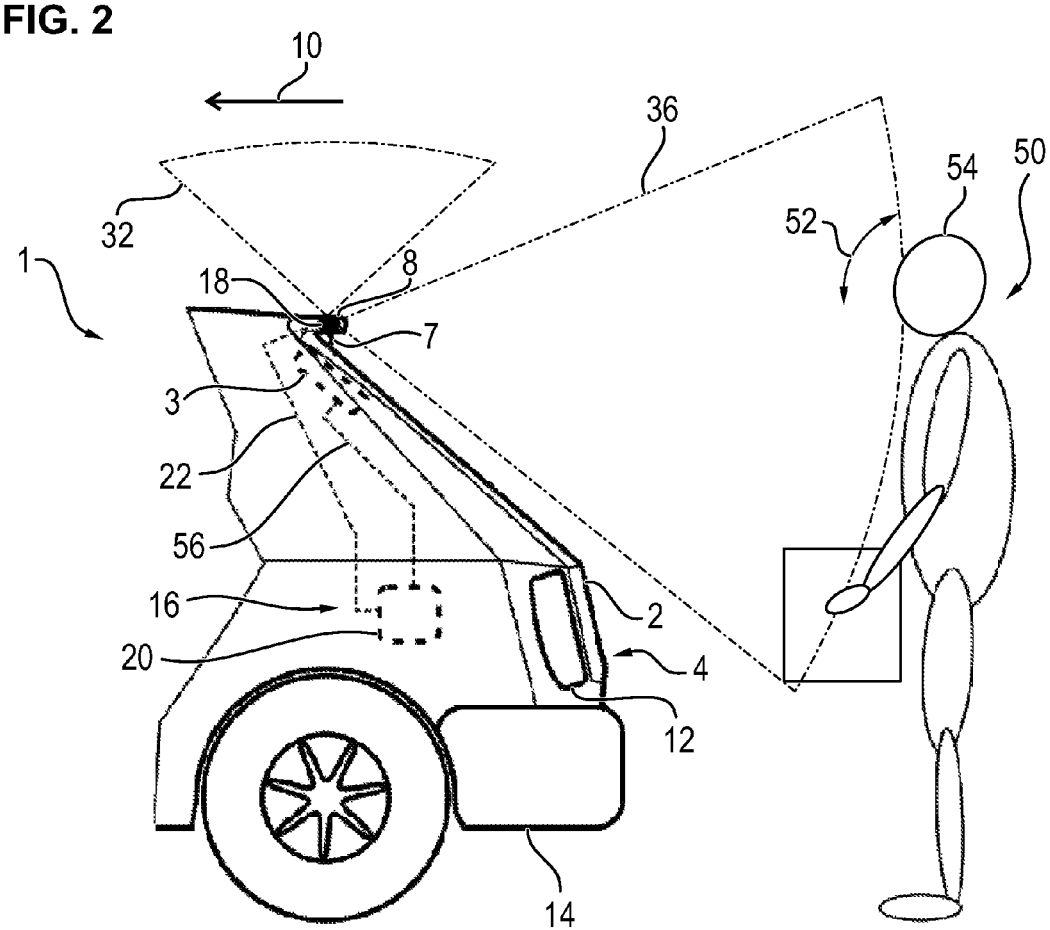
FIG. 2 is a side view of a vehicle user who is carrying out a specific movement in order to signal an actuation command.

In FIG. 2 it is shown that the control unit 20 of the object detection device 16 is configured to detect, by use of the radar sensor 18, a person (referred to below as the vehicle user 50) approaching the rear 1. The control unit 20 uses the central antenna 34 for this purpose. The control unit 20 is also configured to detect, from a radar signal which is output by the radar sensor 18, a movement of the vehicle user 50 which is indicated by the arrow 52 and in the process to determine a movement pattern by using a pattern detection method. The control unit 20 subsequently compares the determined movement pattern with a reference pattern which is stored, for example, in a memory unit of the control unit 20. The reference pattern is predefined, for example, in such a way that it is characteristic of a pitching movement of the head 54 of the vehicle user 50.

In the event of the movement pattern which is carried out by the vehicle user 50 corresponding to the reference pattern, therefore if a nodding movement of the vehicle user 50 has been detected as a movement pattern by the radar sensor 18, the control unit 20 interprets the detected movement pattern as a hatch opening command for the tailgate 2 and actuates the servomotor 3 via a control line 56, with the result that the servomotor 3 moves the tailgate 2 into the open position 5.

Before and during the actuation of the tailgate 2 into the open position 5, the control unit 20 checks, in a collision prevention mode, whether there is an obstacle located in the upper measuring range 32 or in the central measuring range 36. The measuring range 32 serves here to determine the clear height of a multistory car park or of a garage (that is to say the height of the ceiling). In contrast, the central measuring range 36 serves to check whether the vehicle user 50 or another obstacle is located in the pivoting range of the tailgate 2. If the clear height is not sufficient for completely opening the tailgate 2 or if another obstacle is located in the pivoting range, the control unit 20 stops the servomotor 3 and therefore the opening of the tailgate 2.

Figure 3:
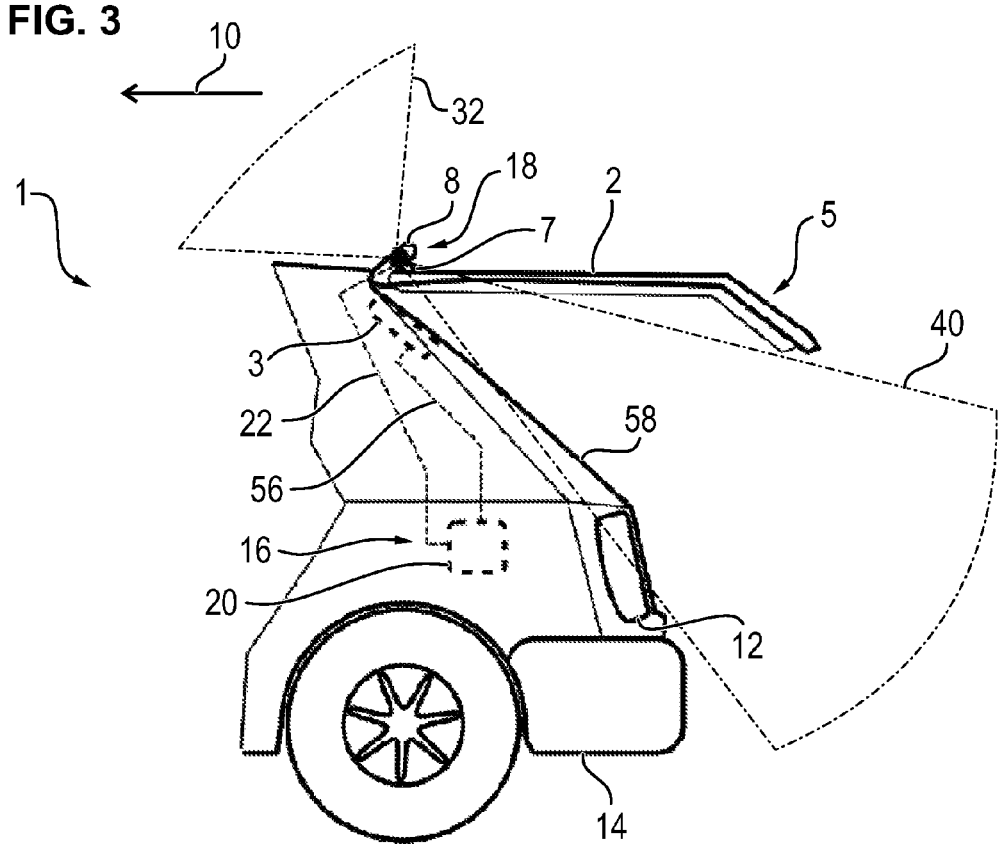
FIG. 3 is a side view of the rear of the vehicle with the tailgate opened.

As can be seen in FIG. 3, when the tailgate 2 is opened the control unit 20 monitors the surroundings to the rear by the lower measuring range 40 of the lower antenna 38. The control unit 20 is configured here, on the one hand, to detect in turn a movement pattern of the vehicle user 50 and subsequently actuate the tailgate 2 into the closed position 4. On the other hand, during the closing of the tailgate 2 the control unit 20 checks, by the lower antenna 38, whether there is an obstacle located in the pivoting range between the tailgate 2 and a closing edge 58 which is struck by the tailgate 2 in the closed position 4. If appropriate, the control unit 20 stops or reverses the servomotor 3. The control unit 20 therefore operates as a trapping prevention device during the closing of the tailgate 2.

FIG. 4 illustrates an alternative exemplary embodiment of the object detection device 16. The radar sensor 18 is installed here in one of the two tail light modules 12. The upper antenna 30 also serves here to determine the clear height. However, in contrast to the exemplary embodiment above the lower antenna 38 is arranged in such a way that by means of its lower measuring range 40 it is possible to check the range directly in front of the rear bumper 14 for an obstacle, for example a high edge of the curb. The lower antenna 38 is also used here in the scope of a parking aid in order to determine precisely the distance between the rear bumper 14 and the obstacle.

FIG. 5 illustrates a further exemplary embodiment of the object detection device 16. The radar sensor 18 is integrated here with its radar antennas 30, 34 and 38 into the rear bumper 14. The orientation and functioning of the respective radar antennas 30, 34 and 38 correspond here to the exemplary embodiment according to FIG. 4.

As is also apparent from FIG. 5, the measuring ranges 32, 36 and 40 can also be arranged in an overlapping fashion.

A further alternative example of the object detection device 16 is illustrated in FIG. 6. The radar sensor 18 is installed here with its three radar antennas 30, 34 and 38 in the license plate recess 9.

The subject matter of the invention can be recognized particularly clearly from the exemplary embodiments described above. Nevertheless, the invention is not restricted to these exemplary embodiments. Instead, further embodiments of the invention can be derived by the person skilled in the art from the claims and the description above. In particular, the individual features of the invention and of the embodiment variants thereof, which are described in the various exemplary embodiments, can also be combined with one another in some other way without departing from the invention.

The following is a summary list of reference numerals and the corresponding structure used in the above description of the invention:

1 vehicle rear
2 tailgate
3 servomotor
4 closed position
5 open position
6 rear windshield
7 brake light
8 roof separation edge
9 license plate recess
10 direction of travel
12 tail light module
14 rear bumper
16 object detection device
18 radar sensor
20 control unit
22 signal line
30 upper antenna
32 (upper) measuring range
34 central antenna
36 (central) measuring range
38 lower antenna
40 (lower) measuring range
50 vehicle user
52 arrow
54 head
56 control line
58 closing edge

The invention claimed is:

1. An object detection device for a vehicle for monitoring surroundings of a rear of the vehicle, the object detection device comprising:
a radar sensor for generating a radar signal containing information about a distance between the vehicle and a vehicle user or other objects in the surroundings to the rear of the vehicle, said radar sensor having a radar antenna directed toward an upper side of the vehicle, said radar sensor configured for mounting on a vehicle component pointing toward the surroundings to the rear of the vehicle, the vehicle component being a roof separation edge which is disposed above a rear windshield on the vehicle; and a control and evaluation unit for determining a movement pattern of the vehicle user on a basis of the radar signal, and to compare the movement pattern with a predefined reference pattern and to actuate an adjustment motor assigned to a hatch of the vehicle and the adjustment motor actuating the hatch between an open position and a closed position when the movement pattern corresponds to the predefined reference pattern.

2. The object detection device according to claim 1, wherein the vehicle component is a light module.

3. The object detection device according to claim 1, wherein the vehicle component is a rear bumper.

4. The object detection device according to claim 1, wherein said radar sensor is an ultra-broadband radar sensor.

5. The object detection device according to claim 1, wherein said control and evaluation unit is configured to differentiate, on a basis of the radar signal, whether a detected object is a person or an animal, or an object.

6. The object detection device according to claim 1, wherein said control and evaluation unit checks, in a time environment with a detection of the movement pattern, a presence of a key signal of an electronic vehicle key which is assigned to the vehicle.

7. The object detection device according to claim 1, wherein said control and evaluation unit monitors, during actuation of the hatch, a pivoting range of the hatch for a presence or absence of obstacles on a basis of the radar signal, and to stop or reverse the actuation when an obstacle is detected in the pivoting range.

8. The object detection device according to claim 1, wherein said radar antenna directed toward the upper side of the vehicle is further directed above the vehicle.

9. The object detection device according to claim 1, wherein said control and evaluation unit detects, in a case of reversing of the vehicle, an obstacle disposed in the surroundings to the rear of the vehicle, on a basis of the radar signal, and if appropriate to output a warning signal in dependence on a distance between the vehicle and the obstacle.

10. The object detection device according to claim 1, wherein said radar sensor contains a radar antenna directed in a direction of ground surrounding the vehicle to the rear.

11. A vehicle, comprising:
a hatch having a rear windshield and a roof separation edge disposed above said rear windshield;
an adjustment motor for moving said hatch;
an object detection device for monitoring surroundings of a rear of the vehicle, said object detection device containing:
a radar sensor for generating a radar signal containing information about a distance between the vehicle and a vehicle user or other objects in the surroundings to the rear of the vehicle, said radar sensor having a radar antenna directed toward an upper side of the vehicle, said radar sensor configured for mounting on said roof separation edge; and
a control and evaluation unit for determining a movement pattern of the vehicle user on a basis of the radar signal, and to compare the movement pattern with a predefined reference pattern and to actuate said adjustment motor and said adjustment motor actuating said hatch between an open position and a closed position when the movement pattern corresponds to the predefined reference pattern.

* * * * *